US007735126B2

(12) United States Patent
Zhang et al.

(10) Patent No.: US 7,735,126 B2
(45) Date of Patent: *Jun. 8, 2010

(54) CERTIFICATE BASED AUTHENTICATION AUTHORIZATION ACCOUNTING SCHEME FOR LOOSE COUPLING INTERWORKING

(75) Inventors: Junbiao Zhang, Bridgewater, NJ (US); Charles Chuanming Wang, Jamison, PA (US); Jun Li, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 998 days.

This patent is subject to a terminal disclaimer.

(21) Appl. No.: 10/512,506

(22) PCT Filed: Mar. 13, 2003

(86) PCT No.: PCT/US03/07574

§ 371 (c)(1),
(2), (4) Date: Oct. 26, 2004

(87) PCT Pub. No.: WO03/091858

PCT Pub. Date: Nov. 6, 2003

(65) Prior Publication Data

US 2005/0154909 A1 Jul. 14, 2005

Related U.S. Application Data

(60) Provisional application No. 60/376,100, filed on Apr. 26, 2002.

(51) Int. Cl.
*H04L 9/32* (2006.01)

(52) U.S. Cl. .................. 726/10; 726/1; 726/2; 713/155; 713/156; 713/157; 713/168; 713/170; 713/175; 713/176; 380/255; 380/270; 380/272; 380/273; 709/225; 705/50; 705/52; 705/67; 455/11

(58) Field of Classification Search ..................... 726/1, 726/2, 10, 27; 713/155, 157, 175, 180, 168, 713/170; 709/225, 229; 455/411
See application file for complete search history.

(56) References Cited

U.S. PATENT DOCUMENTS 5,371,794 A * 12/1994 Diffie et al. ................. 713/156

(Continued)

FOREIGN PATENT DOCUMENTS

GB    2369530    5/2002

(Continued)

OTHER PUBLICATIONS

Ala-Laurila J. et al, Wireless Lan Access Network Architecture for Mobile Operators, IEEE, 2001, pp. 82-89 ; XP001107810.*

(Continued)

*Primary Examiner*—Nasser Moazzami
*Assistant Examiner*—Shanto M Abedin
(74) *Attorney, Agent, or Firm*—Robert D. Shedd; Joseph J. Opalach; Jerome G. Schaefer

(57) ABSTRACT

A method of Authentication Authorization and Accounting (AAA) in an interworking between first and second networks that do not belong in the same administrative domain, using certificate based transactions. In the method according to the invention, the second network sends a public key to the first network, and a certificate to a mobile device. The certificate includes information regarding the subscription level of the mobile device and is signed with a private key of the second network. Upon detection of the first network the mobile device transmits the certificate and the first network authenticates the certificate using the public and private keys of the second network, and authorizes access to the network in response. The first network then sends a session key encrypted with a public key of the mobile device. The mobile device decrypts the session key with a private key and access the first network using the session key. In this manner, interworking is implemented without requiring the deployment of a special interworking function to bridge between the two different types of networks.

23 Claims, 4 Drawing Sheets

U.S. PATENT DOCUMENTS

| | | | | |
|---|---|---|---|---|
| 5,689,563 | A | | 11/1997 | Brown et al. |
| 5,850,444 | A | * | 12/1998 | Rune ........................... 705/79 |
| RE36,946 | E | | 11/2000 | Diffie et al. |
| 6,233,577 | B1 | * | 5/2001 | Ramasubramani et al. ..... 707/9 |
| 6,463,534 | B1 | * | 10/2002 | Geiger et al. ............... 713/168 |
| 6,553,493 | B1 | * | 4/2003 | Okumura et al. ............ 713/170 |
| 6,772,331 | B1 | * | 8/2004 | Hind et al. .................. 713/151 |
| 6,856,800 | B1 | * | 2/2005 | Henry et al. ................ 455/411 |
| 6,879,690 | B2 | * | 4/2005 | Faccin et al. ................ 380/247 |
| 6,915,345 | B1 | * | 7/2005 | Tummala et al. ............ 709/225 |
| 7,028,186 | B1 | * | 4/2006 | Stenman et al. ............ 713/173 |
| 7,046,998 | B2 | * | 5/2006 | Verma et al. ................ 455/418 |
| 7,171,198 | B2 | * | 1/2007 | Paila et al. ............... 455/432.1 |
| 7,174,018 | B1 | * | 2/2007 | Patil et al. .................. 380/258 |
| 7,231,203 | B2 | * | 6/2007 | Marcelli ..................... 455/411 |
| 2001/0010046 | A1 | * | 7/2001 | Muyres et al. ................ 705/52 |
| 2002/0037708 | A1 | * | 3/2002 | McCann et al. ............ 455/411 |
| 2002/0120536 | A1 | | 8/2002 | Maung et al. |
| 2002/0174335 | A1 | * | 11/2002 | Zhang et al. ................ 713/168 |
| 2003/0039234 | A1 | * | 2/2003 | Sharma et al. ............. 370/338 |
| 2003/0056096 | A1 | | 3/2003 | Albert et al. |
| 2003/0139180 | A1 | * | 7/2003 | McIntosh et al. ............ 455/426 |
| 2003/0182553 | A1 | * | 9/2003 | Medvinsky ................ 713/171 |
| 2004/0015689 | A1 | * | 1/2004 | Billhartz .................... 713/156 |
| 2005/0013264 | A1 | * | 1/2005 | Sundberg ................... 370/328 |
| 2005/0120202 | A1 | * | 6/2005 | Cuellar et al. ............... 713/156 |
| 2005/0154895 | A1 | * | 7/2005 | Zhang ........................ 713/182 |
| 2005/0239461 | A1 | | 10/2005 | Verma et al. |
| 2005/0240760 | A1 | * | 10/2005 | Zhang ........................ 713/157 |
| 2006/0013170 | A1 | | 1/2006 | Shin et al. |

FOREIGN PATENT DOCUMENTS

| | | |
|---|---|---|
| JP | 9-74408 A | 3/1997 |
| WO | WO 00/72506 A1 | 11/2000 |
| WO | WO 02/065696 | 8/2002 |

OTHER PUBLICATIONS

Menezes et al, Handbook of Applied Cryptography, CRC Press Series on Discrete Mathematics and its Applications, 1997, XP002322259.*

Chang-Seop Park, On Certificate-Based Security Protocols for Wireless Mobile Communication Systems, pp. 50-55, IEEE, 1997.*

R. K. Shyamasundar et al, MicroBill: An Efficient Secure System for Subscription Based Services, pp. 1-13, Springer-Verlag, 2002.*

Joon S. Park et al, Binding Identities and Attributes Using Digitally Signed Certificates, pp. 120-127, IEEE, 2000.*

Menezes, Oorschot, Vanstone: "Handbook of Applied Cryptography", CRC Press Series on Discrete Mathematics and Its Applications, 1997, XP002322259 Boca Raton, FL, US.

Ala-Laurila J. et al.: "Wireless Lan Access Network Architecture for Mobile Operators", IEEE Communications Magazine, IEEE Service Center, Piscataway, NJ, US, vol. 39, No. 11, Nov. 2001, pp. 82-89, XP001107810 European Search Report Attached.

Search Report Dated Mar. 4, 2004.

* cited by examiner

CERTIFICATE BASED AUTHENTICATION AUTHORIZATION ACCOUNTING SCHEME FOR LOOSE COUPLING INTERWORKING

This application claims the benefit, under 35 U.S.C. §365 of International Application PCT/US03/07574, filed Mar. 13, 2003, which was published in accordance with PCT Article 21(2) on Nov. 6, 2003 in English and which claims the benefit of U.S. Provisional Patent Application No. 60/376,100, filed Apr. 26, 2002.

BACKGROUND OF THE INVENTION

1. Field of the Invention

The present invention generally relates to networking and, more particularly, to a certificate based Authentication Authorization and Accounting (AAA) scheme for loose coupling interworking between two different access networks.

2. Related Art

Typically, Authentication, Authorization and Accounting (AAA) are required to access and utilize networks such as cellular networks and Wireless Local Area Networks (WLANs). However, the implementing of AAA can be difficult as well as requiring additional software and/or hardware in the case of interworking between two different radio access networks that do not belong to the same administrative domain and do not share the same AAA schemes.

There are two main types of interworking between cellular networks and WLANs: tight coupling and loose coupling. In a loose coupling scenario, the WLAN and the cellular network have independent data paths but the AAA for WLAN users relies on cellular network AAA functions. However, the cellular network AAA protocols (MAP/SS7) are incompatible with Internet Protocol (IP) based protocols used by WLAN users. Two approaches have been proposed. In the first approach, an AAA interface is provided in the cellular network Home Location Register (HLR). This requires either duplicating HLR data or providing a protocol converter between Radius/Diameter and MAP. In the second approach, if the Mobile Terminal (MT) uses a Subscriber Identity Module (SIM) card based authentication mechanism (e.g., NOKIA's wireless operator LAN), then the AAA will follow the cellular procedure. An AAA InterWorking Function (IWF) is necessary to interface with the HLR and an MT. Functionality wise, it is similar to a Serving GPRS (General Packet Radio Service) Support Node (SGSN) or Mobile Switching Center (MSC) from the AAA perspective except AAA traffic is carried through IP.

With both approaches, special interworking functions or gateways need to be deployed by the cellular operators. With the second approach, users are required to have a SIM card for WLAN access, but most WLAN users do not have SIM cards available on their laptops or Personal Digital Assistants (PDAs).

Accordingly, it would be desirable and highly advantageous to have an Authentication Authorization and Accounting (AAA) scheme for the case of interworking between two different networks that do not belong to the same administrative domain and do not share the same AAA schemes, where the AAA scheme does not require the deployment of a special interworking function to bridge between the two different types of networks.

SUMMARY OF THE INVENTION

The problems stated above, as well as other related problems of the prior art, are solved by the present invention, a certificate based Authentication, Authorization and Accounting (AAA) scheme for an interworking between different access networks.

Advantageously, the present invention can operate without interaction with the cellular core network during authentication. Compared with existing schemes, the proposed scheme does not require the cellular operators to adapt their Home Location Register (HLR) interfaces to provide authentication for WLAN users through Internet protocols.

According to an aspect of the present invention, there is provided a method for Authentication Authorization and Accounting (AAA) in an interworking between at least two networks. The at least two networks include a first network and a second network. A user of the first network is verified based on a certificate, by the second network. A session key is sent from the second network to a mobile device of the user when the user is verified. The session key is used for encrypting communication between the mobile device and the second network.

These and other aspects, features and advantages of the present invention will become apparent from the following detailed description of preferred embodiments, which is to be read in connection with the accompanying drawings.

DETAILED DESCRIPTION OF THE INVENTION

The present invention is directed to a certificate based Authentication Authorization and Accounting (AAA) scheme for loose coupling interworking. It is to be appreciated that the present invention is applicable to any combination of access networks (such as, e.g., an interworking between a Community Access Television (CATV) network and a Wireless Local Area Network (WLAN)). However, the present invention is particularly applicable to a cellular network and WLAN in a loose interworking arrangement.

It is to be understood that the present invention may be implemented in various forms of hardware, software, firmware, special purpose processors, or a combination thereof, for example, within a mobile terminal, access point, or a cellular network. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

Figure 1:
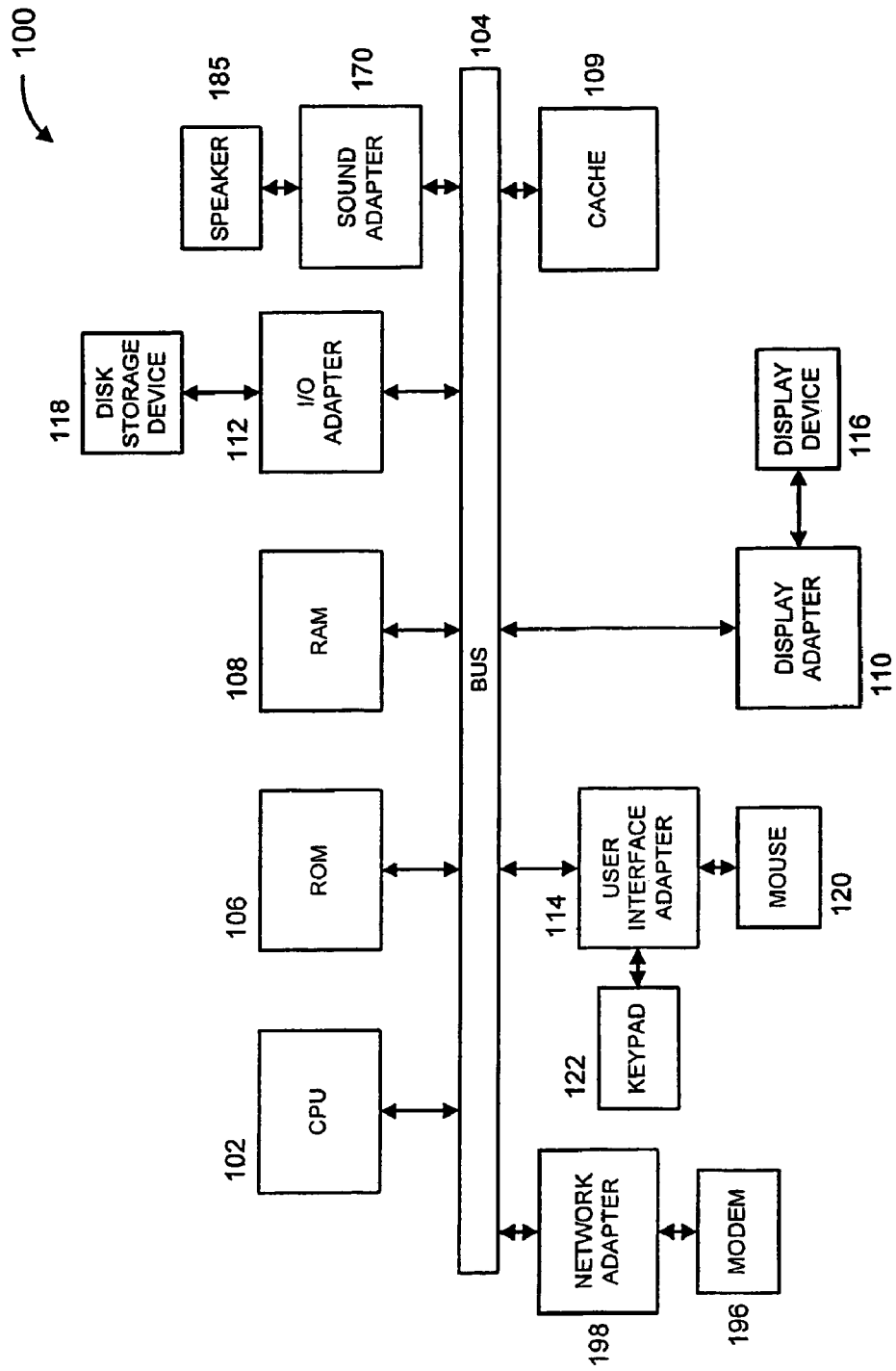
FIG. 1 is a block diagram illustrating a computer system 100 to which the present invention may be applied, according to an illustrative embodiment of the present invention.

FIG. 1 is a block diagram illustrating a computer system 100 to which the present invention may be applied, according to an illustrative embodiment of the present invention. The computer processing system 100 may be embodied in a mobile device used to access a cellular network or a WLAN. The computer processing system 100 includes at least one processor (CPU) 102 operatively coupled to other components via a system bus 104. A read only memory (ROM) 106, a random access memory (RAM) 108, a display adapter 110, an I/O adapter 112, a user interface adapter 114, a sound adapter 170, and a network adapter 198, are operatively coupled to the system bus 104.

A display device 116 is operatively coupled to system bus 104 by display adapter 110. A disk storage device (e.g., a magnetic or optical disk storage device) 118 is operatively coupled to system bus 104 by I/O adapter 112. A mouse 120 and keyboard/keypad 122 are operatively coupled to system bus 104 by user interface adapter 114. The mouse 120 and keyboard 122 are used to input and output information to and from system 100.

At least one speaker (herein after "speaker") 185 is operatively coupled to system bus 104 by sound adapter 170.

A (digital and/or analog) modem 196 is operatively coupled to system bus 104 by network adapter 198.

Figure 2:
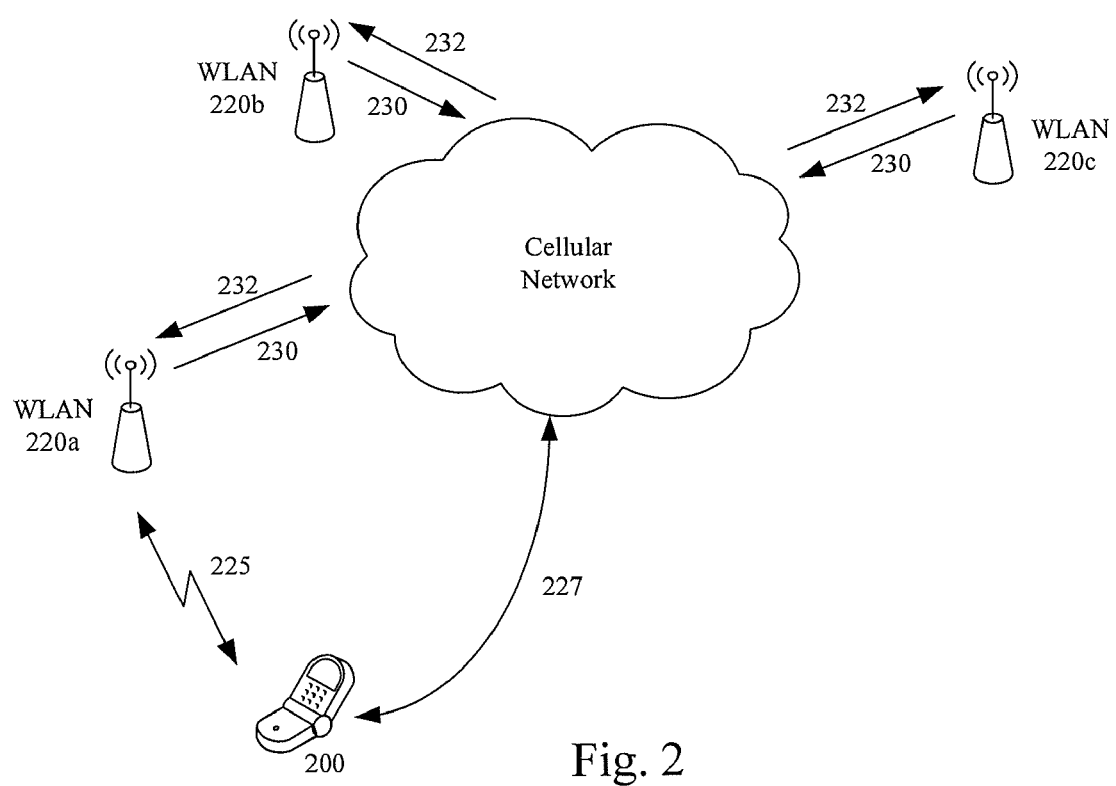
FIG. 2 is a block diagram illustrating a combination of access networks to which the present invention may be applied, according to an illustrative embodiment of the present invention.

FIG. 2 is a block diagram illustrating a combination of access networks to which the present invention may be applied, according to an illustrative embodiment of the present invention. In the illustrative embodiment of FIG. 2, the combination of access networks includes a cellular network 210 and three Wireless Local Area Network (WLAN) 220a, 220b, and 220c. Mobile terminal 200, cellular network 210 and WLANs 220 may communicate with each other as indicated. WLAN 220a communicates with mobile terminal 200 via path 225. Mobile terminal 200 also communicates with cellular network 210 via cellular link 227. WLAN 220a, b, and c have interworking relationships with cellular network 210. This relationship interface is depicted as links 230 and 232 between the WLAN a, b, and c and the cellular network 210. The present invention provides a certificate based scheme to provide AAA services to WLAN users. As noted above, the present invention may be applied to any combination of networks, including different numbers and different types of networks.

Figure 3:
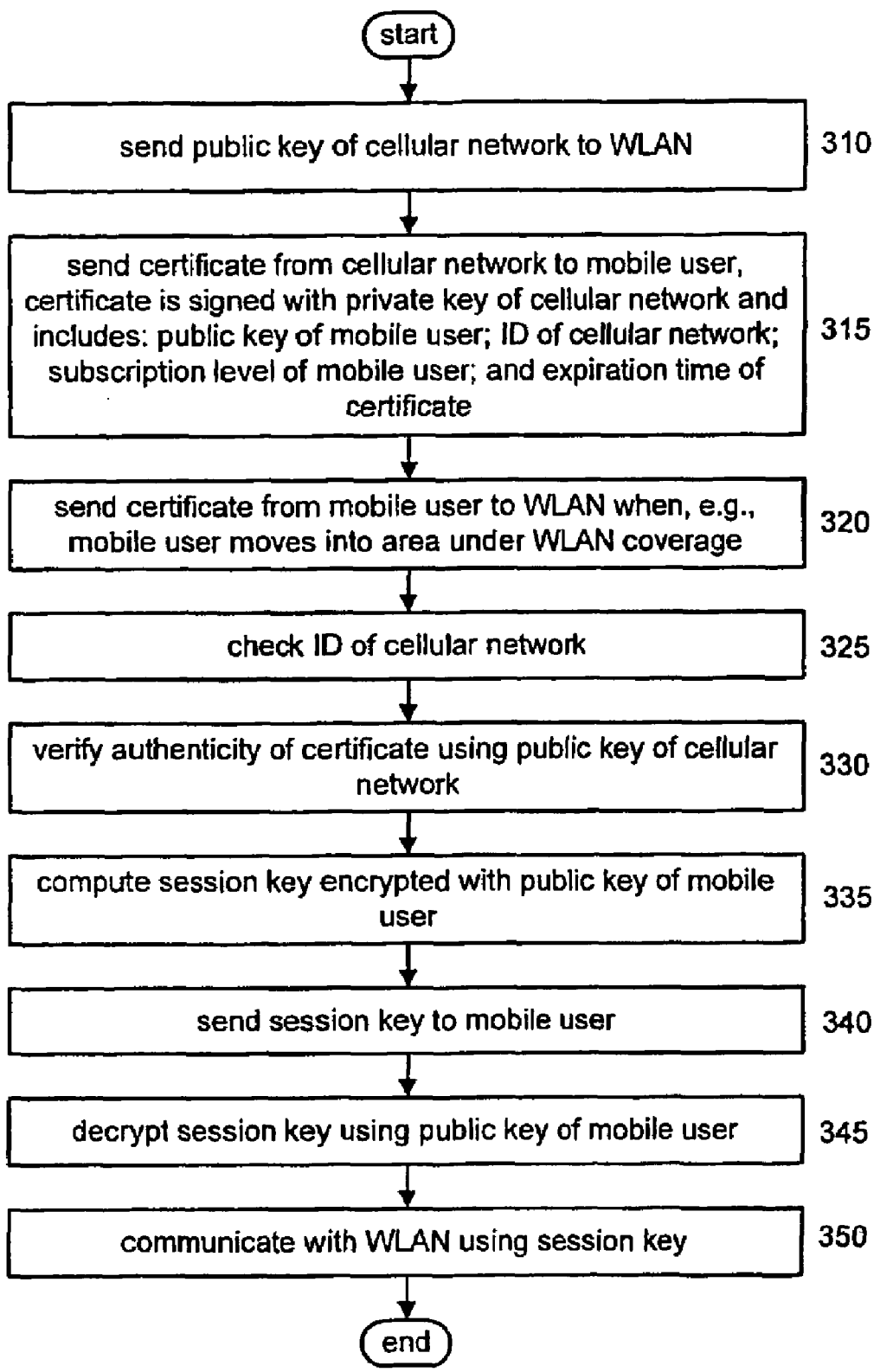
FIG. 3 is a flow chart illustrating a certificate based method for Authentication Authorization and Accounting (AAA) of a mobile user in a loose coupling interworking between access networks, according to an illustrative embodiment of the present invention.

FIG. 3 is a flow diagram illustrating a certificate based method for Authentication Authorization and Accounting (MA) of a mobile user in a loose coupling interworking between access networks, according to an illustrative embodiment of the present invention. The access networks include a cellular network and a Wireless Local Area Network (WLAN), such as those shown in FIG. 2. The cellular network is associated with at least a mobile user. It is to be appreciated that while the illustrative embodiment of FIG. 3 (as well as the illustrative embodiment of FIG. 4 below) is described with respect to a cellular network and a WLAN, any combination of networks, including the preceding and other types of networks as well as different numbers of networks, may be readily employed in accordance with the present invention while maintaining the spirit and scope of the present invention.

Initially, a public key $K_{pub\_cn}$ associated with the cellular network is sent from the cellular network to the WLAN, which has an interworking contract with the cellular network (step 310). In the event that the cellular network has an interworking contract with more than one WLAN, then the cellular network could send the cellular network public key $K_{pub\_cn}$ to all of the WLANs with which it has a contract. It is preferable, but not mandatory, that the cellular network public key $K_{pub\_cn}$ is distributed through a secure channel so that the recipient WLAN can be sure that $K_{pub\_cn}$ is indeed a valid public key associated with the cellular network.

A certificate is then sent from the cellular network to the mobile user (step 315). The certificate includes, but is not limited to, the following: public key $K_{pub\_u}$ associated with the mobile user; ID of cellular network; subscription level of the mobile user, for example, whether the mobile user has subscribed for WLAN service, for authorization/verification purposes; expiration time of the certificate; and ID of the mobile user. The certificate is signed with a private key $K_{pri\_cn}$ of the cellular network. It is preferable, but not mandatory, that the certificate is sent to the mobile user when the mobile user signs up with the cellular network for WLAN interworking service.

The various keys and the certificate are used as follows. When the mobile user moves into an area under WLAN coverage, the certificate is sent from the mobile user to the WLAN (step 320). The WLAN then: checks the ID of the cellular network included in the certificate (step 325); checks the ID of the mobile user included in the certificate (e.g., for an authorization/verification purpose(s)) (step 327); verifies the authenticity of the certificate using the public key $K_{pub\_Cn}$ of the cellular network (step 330); upon verification, computes a session key for the mobile user that is encrypted with a public key $K_{pub\_u}$ of the mobile user that was included in the certificate (step 335); and sends the session key to the mobile user (step 340). The session key may be, but is not limited to, a per user Wired Equivalent Privacy (WEP) key.

Upon receiving the session key, the mobile user decrypts the session key using his/her private key $K_{pri\_u}$ (step 345) and communicates with the WLAN using the session key (i.e., all subsequent communication between the mobile device and the WLAN is encrypted with the session key) (step 350). Thus, the mobile user is authenticated by the WLAN since only that specific mobile user has the necessary private key $K_{pri\_u}$ to decrypt the session key.

Figure 4:
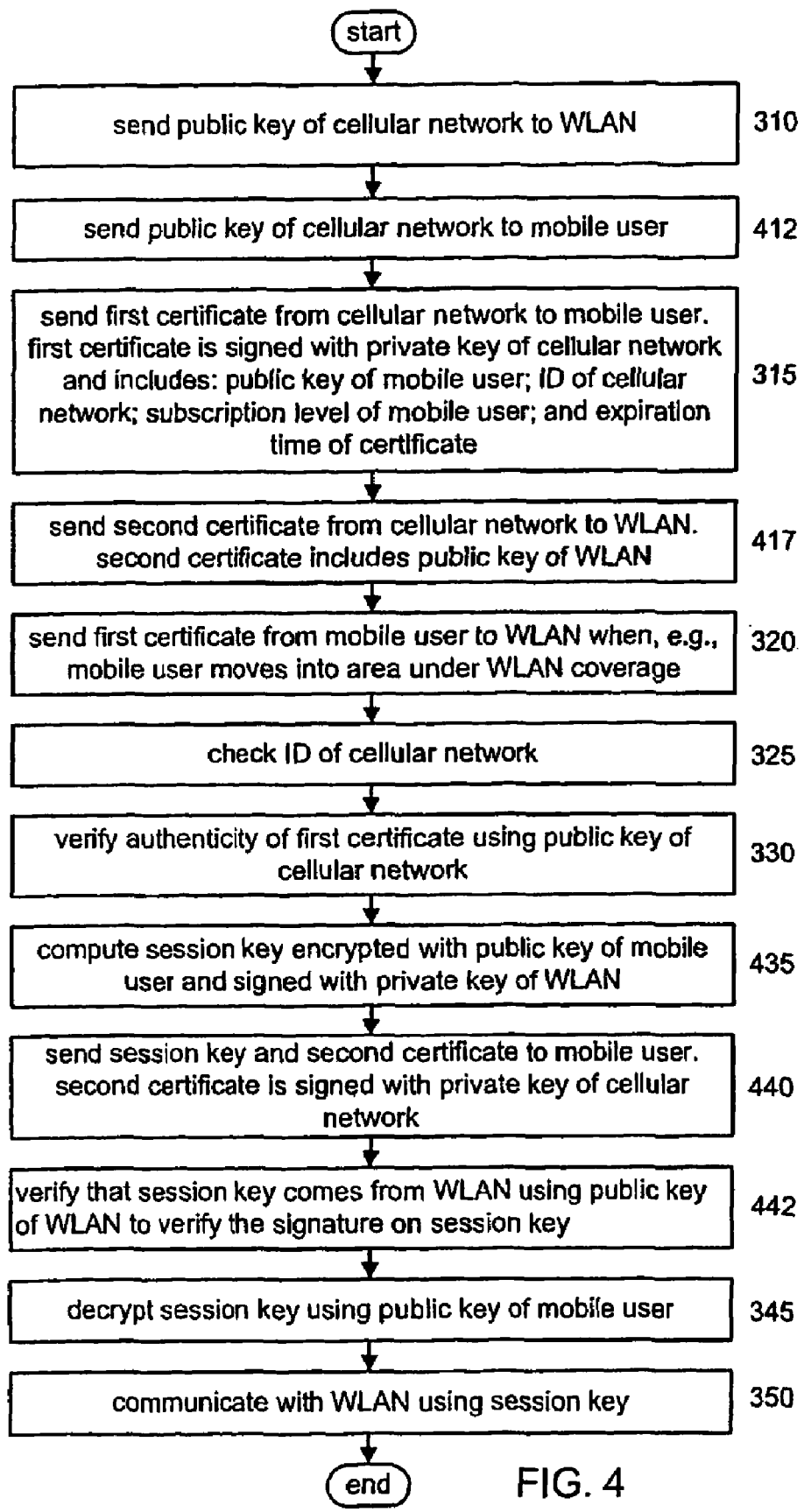
FIG. 4 is a flow chart illustrating a certificate based method for Authentication Authorization and Accounting (AAA) of a mobile user in a loose coupling interworking between access networks, according to another illustrative embodiment of the present invention.

FIG. 4 is a flow diagram illustrating a certificate based method for Authentication Authorization and Accounting (AAA) of a mobile user in a loose coupling interworking between access networks, according to another illustrative embodiment of the present invention. The access networks include a cellular network and a Wireless Local Area Network (WLAN). The cellular network is associated with at least a mobile user. The method of FIG. 4 allows for mutual authentication between the mobile user and the WLAN, so that the mobile user can also verify that he/she is indeed communicating with a legitimate WLAN (to prevent, e.g., messages from being snooped).

A public key $K_{pub\_cn}$ of the cellular network is sent from the cellular network to the WLAN, which has an interworking contract with the cellular network (step 310). In the event that the cellular network has an interworking contract with more than one WLAN, then the cellular network could send the public key $K_{pub\_cn}$ of the cellular network to all of these WLANs. It is preferable, but not mandatory, that the public key $K_{pub\_cn}$ is distributed through a secure channel so that the WLAN can be sure that $K_{pub\_cn}$ is indeed the public key of the cellular network.

The public key $K_{pub\_cn}$ of the cellular network is also sent from the cellular network to the mobile user (step 412).

A first certificate is sent from the cellular network to the mobile user (step 315). The first certificate includes, but is not limited to, the following: public key $K_{pub\_u}$ of the mobile user; ID of cellular network; subscription level of the mobile user (whether the mobile user has subscribed for WLAN service); expiration time of the first certificate; and ID of mobile user. The first certificate is signed with a private key $K_{pri\_cn}$ of the cellular network. It is preferable, but not mandatory, that the first certificate is sent to the mobile user when the mobile user signs up with the cellular network for WLAN interworking service.

A second certificate is also sent from the cellular network to each WLAN (that has a contract agreement with the cellular network) (step 417). The second certificate includes, but is not limited to, a public key $K_{pub\_w}$ of the WLAN. The second certificate is signed with the private key $K_{pri\_cn}$ of the cellular network.

The first certificate is sent from the mobile user to the WLAN (e.g., an Access Point (AP) or other entity), e.g., when the mobile user moves into an area under WLAN coverage (step 320). In response, the WLAN checks the ID of the cellular network included in the first certificate (step 325), checks the ID of the mobile user included in the first certificate (e.g., for an authorization/verification purpose(s)) (step 327), and verifies the authenticity of the first certificate using the public key $K_{pub\_cn}$ of the cellular network (step 330). Upon verification, the WLAN computes a session key for the mobile user that is encrypted with the public key $K_{pub\_u}$ of the mobile user (that was included in the first certificate) and that is signed with the private key $K_{pri\_w}$ of the WLAN (step 435), and sends the session key and the second certificate to the mobile user (step 440). The session key may be, but is not limited to, a per user Wired Equivalent Privacy (WEP) key.

Upon receiving the session key and the second certificate, the mobile user verifies that the second certificate is valid using the public key $K_{pub\_cn}$ of the cellular network (step 441). If it is valid, then the public key $K_{pub\_w}$ of the WLAN is extracted from the second certificate (step 442). The mobile user then verifies that the session key actually comes from the WLAN by using the public key $K_{pub\_w}$ of the WLAN to verify the signature on the session key (step 442). If the encrypted session key is verified to come from the WLAN, the mobile user then decrypts the session key using his/her private key $K_{pri\_u}$ (step 345) and communicates with the WLAN using the session key. All subsequent communication between the mobile device and the WLAN is encrypted with the session key starts using the session key for communicating with the WLAN (step 350).

Thus, a primary advantage of the present invention as compared with the prior art is that the present invention does not require any physical interworking functions in order for the WLAN to interact with the cellular network for the purpose of user authentication. In fact, by using certificates, the WLANs do not need any interaction with the cellular network at the time the mobile terminal requests access to the network in order to grant user access. Since the certificate includes the identity of the mobile user, accounting functions can be easily performed using this information, including the user identity.

Although the illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for providing authentication, authorization, and accounting (AAA) in a first network for a mobile device that is associated with a second network, the first and second networks having respective AAA schemes, comprising the steps of:
   receiving, by the first network and the mobile device, a first key from the second network;
   receiving, by the mobile device, a first certificate from the second network, the first certificate includes an identifier (ID) associated with the second network, a public key associated with the mobile device, and a subscription level of the mobile device with the first network, the subscription level indicating whether the mobile device is a subscriber of an interworking service;
   receiving, by the first network, from the second network, a second certificate which includes a public key associated with the first network, the second certificate signed with a second key of the second network;
   receiving, by the first network, the first certificate from the mobile device;
   authenticating, at the first network, the first certificate using the first key, and if the first certificate is authenticated,
   generating a session key by the first network, the session key having a signature using a private key of the first network,
   transmitting the session key and the second certificate to the mobile device by the first network,
   at the mobile device, validating the second certificate using the first key, extracting the public key from the second certificate, and verifying the signature of the session key using the extracted public key, and
   allowing the mobile device to access the first network using the session key.

2. The method according to claim 1, wherein the first certificate further includes a signature comprising the second key of the second network.

3. The method according to claim 2, wherein the authenticating step comprises authenticating the first certificate in response to the first and second keys of the second network.

4. The method according to claim 2, wherein the generating step comprises the steps of computing the session key and encrypting the session key using the public key associated with the mobile device.

5. The method according to claim 1, wherein the first certificate includes an expiration time that indicates when the certificate expires, and further comprising the step of checking the certificate to determine whether the certificate has expired.

6. The method according to claim 1, further comprising the step of generating accounting information based on the usage of the first network by the mobile device following the authentication.

7. A method for accessing a first network using a mobile device associated with a second network, the method comprising the steps of:
  receiving, by the mobile device, a first certificate from a second network that has an existing interworking relationship with the first network, the first certificate includes an identifier (ID) associated with the second network, a public key associated with the mobile device, and a subscription level associated with the mobile device, the subscription level indicating whether the mobile device is a subscriber of the interworking relationship;
  in response to detection of the first network by the mobile device, transmitting the first certificate to the first network, whereby authentication, authorization and accounting is performed in response to the first certificate and a first key transmitted from the second network to the first network;
  receiving, by the mobile device, a session key and a second certificate from the first network upon authentication, the second certificate comprising a public key associated with the first network, the second certificate signed with a private key of the second network; and
  validating, by the mobile device, the second certificate using a public key of the second network, extracting the public key of the first network from the second certificate, and verifying a signature of the session key using the extracted public key of the first network, and
  accessing, by the mobile device, the first network using the session key.

8. The method according to claim 7, wherein the first certificate further includes a signature comprising the private key of the second network.

9. The method according to claim 8, wherein the receiving step comprises receiving a session key encrypted using a public key of the mobile device, and further comprising the step of decrypting the session key using a private key associated with the mobile device.

10. The method according to claim 7, wherein the first certificate includes an expiration time that indicates when the first certificate expires.

11. The method according to claim 7, wherein the first certificate includes the ID associated with the second network, wherein the second network is associated with the mobile device, whereby accounting information based on the usage of the first network by the mobile device is generated by the first network using the ID associated with the second network.

12. An apparatus for accessing a first network, including authentication, authorization, and accounting via a second network, and for associating with the second network, the apparatus comprising:
  means for receiving, a first certificate from the second network, which has an existing interworking relationship with the first network, the first certificate includes an identifier (ID) associated with the second network, a public key of the apparatus, and a subscription level of the apparatus with the first network, the subscription level indicating the interworking relationship;
  memory for storing, in the mobile device, the first certificate;
  means for detecting the presence of the first network, and transmitting the first certificate to the first network in response to the detection of the first network, whereby authentication, authorization and accounting is performed by the first network in response to the first certificate, and a public key provided by the second network;
  means for receiving, a session key and a second certificate from the first network, the second certificate comprising a public key of the first network, the second certificate signed with a private key of the second network;
  means for validating, the second certificate using the public key provided the second network, extracting the public key of the first network from the second certificate, and verifying a signature of the session key using the extracted public key of the first network;
  means for decrypting the session key using a private key associated with the apparatus; and
  means for accessing the first network, using the session key.

13. The apparatus according to claim 12, wherein the first certificate further includes a public key of the apparatus, and a subscription expiration time associated with the apparatus.

14. A mobile device, comprising:
  means for receiving a first certificate from a first network, the first certificate comprising a public key associated with the mobile device, and an identifier (ID) for the first network, and a subscription level of a user of the mobile device with the first network, the subscription level indicating whether the mobile device is a subscriber of an interworking service;
  memory storage for the first certificate;
  means for transmitting the first certificate to the second network upon detecting the second network;
  means for receiving a session key and a second certificate from the second network in response to authentication of the first certificate by the second network, the second certificate comprising a public key of the second network, the second certificate signed with a private key of the first network;
  a central processor unit for validating the second certificate using a public key of the first network, extracting the public key of the second network from the second certificate, and verifying a signature of the session key using the extracted public key;
  means for decrypting the session key using a private key of a user of the mobile device; and
  means for communicating securely with the second network using the session key.

15. The mobile device according to claim 14, wherein the first network is a cellular network.

16. The mobile device according to claim 14, wherein the first certificate further comprises: an expiration time of the certificate, and a mobile user ID.

17. The mobile device according to claim 14, wherein the first certificate is signed with a private key of the first network.

18. The mobile device according to claim 14, wherein the session key is encrypted with a public key of a user of the mobile device.

19. The mobile device according to claim 14, wherein the session key is a per user wired equivalent privacy key.

20. The mobile device according to claim 14, wherein the second network is a wireless local area network.

21. A mobile device, comprising:
  means for receiving, a public key of a first network;
  means for receiving, a first certificate from the first network, the first certificate comprising an identifier (ID) for a second network, a public key associated with the mobile device, and a subscription level of the mobile device with the second network, the subscription level indicating whether the mobile device is a subscriber of an interworking service;

memory storage for the first certificate;

means for transmitting the first certificate to the second network upon detecting the second network;

means for receiving a second certificate and a session key generated by the second network in response to authentication of the first certificate by the second network;

means for verifying validity of the second certificate using the public key of the first network and if validity is verified, extracting a public key of the second network from the second certificate;

means for verifying the session key was transmitted by the second network using the extracted public key of the second network to verify a signature on the session key and if the session key is verified then decrypting the session key with a private key of a user of the mobile device; and means for communicating securely with the second network using the session key.

22. The mobile device according to claim 21, wherein the second network is a wireless local area network.

23. The mobile device according to claim 21, wherein the first network is a cellular network.

* * * * *